US012609925B2

(12) United States Patent
O'Neill et al.

(10) Patent No.: US 12,609,925 B2
(45) Date of Patent: Apr. 21, 2026

(54) SYSTEMS AND METHODS FOR MONITORING DECENTRALIZED DATA STORAGE

(71) Applicant: MASTERCARD INTERNATIONAL INCORPORATED, Purchase, NY (US)

(72) Inventors: John O'Neill, Darien, CT (US); Ji Eun Cha, New York, NY (US); Prashant Sharma, Madison, NJ (US); Przemek Praszczalek, Cypress, TX (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 510 days.

(21) Appl. No.: 17/692,140

(22) Filed: Mar. 10, 2022

(65) Prior Publication Data

US 2023/0291731 A1 Sep. 14, 2023

(51) Int. Cl.
*H04L 9/40* (2022.01)

(52) U.S. Cl.
CPC ...... *H04L 63/0853* (2013.01); *H04L 63/0861* (2013.01)

(58) Field of Classification Search
CPC .................. H04L 63/0853; H04L 63/0861
See application file for complete search history.

(56) References Cited

U.S. PATENT DOCUMENTS

| | | | |
|---|---|---|---|
| 9,426,156 B2 | 8/2016 | Herbert et al. | |
| 10,009,335 B2 * | 6/2018 | Mathew | .............. H04L 65/1069 |
| 10,740,751 B1 * | 8/2020 | Doss | ................... G06Q 20/384 |
| 2017/0076143 A1 * | 3/2017 | Sapiro | ................ G06F 18/2451 |

(Continued)

FOREIGN PATENT DOCUMENTS

KR 10-2308859 10/2021

OTHER PUBLICATIONS

Trust Stamp: Secure, Private and Trusted Identity; https://truststamp.ai/; Trust Stamp © 2021; 6 pgs.

(Continued)

*Primary Examiner* — Farid Homayounmehr
*Assistant Examiner* — Brian William Avery
(74) *Attorney, Agent, or Firm* — Harness, Dickey & Pierce, P.L.C.

(57) ABSTRACT

Systems and methods are provided for use in monitoring decentralized data structures including identity attributes, through tokenization of the attributes. One example computer-implemented method includes receiving a request associated with a digital identity including multiple attributes and, for each of the attributes in the request, generating a token specific to the attribute, searching for the generated token in a network graph having multiple stored tokens, and identifying one of the multiple stored tokens as a match to the generated token. The computer-implemented method then further includes, for each of the attributes in the request, retrieving additional ones of the multiple stored tokens linked to the identified one of the stored tokens, comparing the retrieved tokens to the generated token, and promoting the request for further action, in response to at least one of the retrieved tokens being inconsistent with the generated token.

9 Claims, 5 Drawing Sheets

(56) References Cited

U.S. PATENT DOCUMENTS

| | | | |
|---|---|---|---|
| 2020/0050795 A1* | 2/2020 | Solomon | G06F 16/2255 |
| 2020/0358796 A1* | 11/2020 | Kundu | G06N 3/045 |
| 2020/0366664 A1 | 11/2020 | Hayes et al. | |
| 2021/0044976 A1* | 2/2021 | Avetisov | G06F 21/64 |
| 2021/0250347 A1 | 8/2021 | McBain et al. | |
| 2022/0021537 A1 | 1/2022 | Wagner et al. | |
| 2022/0131844 A1* | 4/2022 | Sherlock | H04L 63/105 |

OTHER PUBLICATIONS

Lindley, E. et al., "The Privacy Protecting Power of IT2"; Trust Stamp, Sep. 6, 2020; 11 pgs.

* cited by examiner

SYSTEMS AND METHODS FOR MONITORING DECENTRALIZED DATA STORAGE

FIELD

The present disclosure generally relates to systems and methods for monitoring decentralized data structures (and more generally, decentralized data storage) including (e.g., storing, containing, etc.), for example, attributes associated with user identifies, etc., through tokenization of the attributes.

BACKGROUND

This section provides background information related to the present disclosure which is not necessarily prior art.

It is known for parties to engage with other parties, on the basis of identity attributes asserted by one of the parties. As such, it is common for the parties asserting such identity attributes to be authenticated in connection with such engagements (e.g., via physical documents, digital identities, etc.). Moreover, it is further known for parties to present false identities, in order to defraud relying parties (e.g., banking institutions, individual customers, etc.). In some instances the false identities include valid attributes, in combination with fictitious or fabricated attributes. Consequently, in order to avoid basing an engagement on such false identifies, the relying parties are known to attempt to verify physical documents associated with the presented identities, verify government identification numbers (e.g., social security numbers, employer identification numbers (EINs), etc.), request third-party verification of the identities of the parties (e.g., via digital identity services, etc.), and/or check references and/or histories associated with the parties, etc.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

Users often present identities to relying parties for purposes of establishing relationships with the relying parties (e.g., opening accounts, etc.). In connection therewith, it is possible for users to provide false identities, which may consist of one or more fictitious or fabricated attributes. In some instances, the false identities may be synthetic identities, where the synthetic identities include combinations of one or more real identity attributes and one or more fictitious or fabricated identity attributes. These false/synthetic identities are identified through linking common attributes among different interactions. In the context of digital identities, however, identity attributes are often decentralized to limit exposure of personal identifying information for breach of a single node of an identity network. By decentralizing the identity attributes, abilities to detect and/or prevent identity fraud is limited.

Uniquely, the systems and methods herein permit monitoring of identity attributes in a decentralized digital identity scheme, through use of tokenized representations of the attributes. In particular, certain identity attributes included in decentralized digital identity data structures are tokenized (e.g., as tokens of personal identifying information (PII), etc.), whereby the original attributes are not discoverable, and whereby the tokens are built into digital identity graphs in one or more local data structures. The token graphs are then leveraged to track the different attributes, relationships between the same, and use statistics therefor, etc. In this manner, rules are imposed to limit and/or inhibit fraudulent use of different identity attributes, to flag the use of certain identity attributes, and/or to elevate review of interactions containing flagged and/or repeated use identity attributes. Consequently, the systems and methods herein provide for enhanced data security, as related to digital identity data/attributes spread across one or more decentralized data structures, etc.

Figure 1:
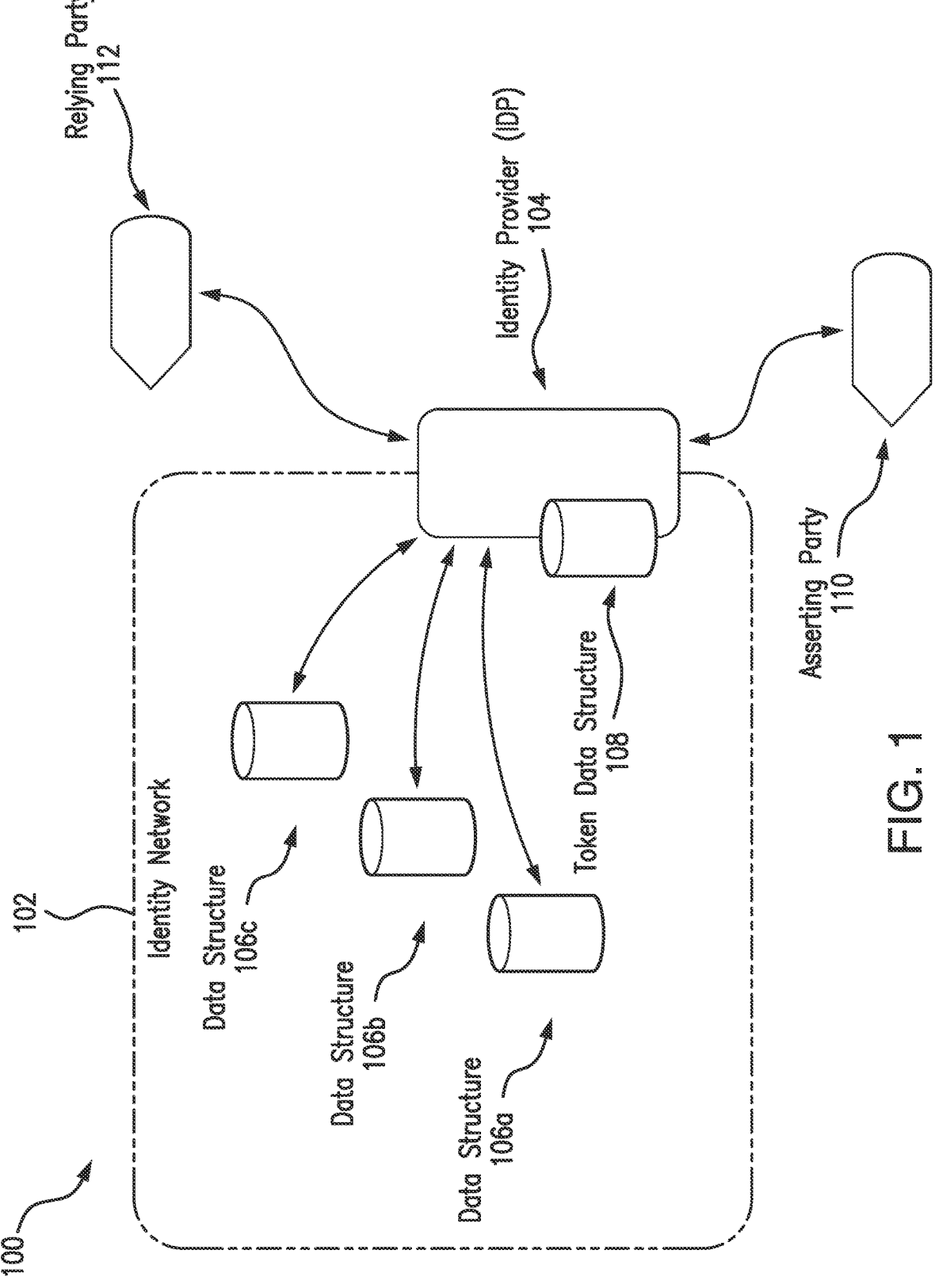
FIG. 1 illustrates an example system of the present disclosure suitable for use in monitoring one or more decentralized data structures including various attributes (e.g., identity attributes, etc.), through tokenization of the attributes.

FIG. 1 illustrates an example system 100 in which one or more aspects of the present disclosure may be implemented. Although the system 100 is presented in one arrangement, other embodiments may include the parts of the system 100 (or other parts) arranged otherwise depending on, for example, relationships between parties, types of users and/or relying parties present, types of interactions, privacy requirements, etc.

The system 100 generally includes an identity network 102, an asserting party 110 (e.g., a user, etc.), and a relying party 112, each of which is coupled to (and is in communication with) one or more networks. The one or more network(s) is/are indicated generally by arrowed lines in FIG. 1, and may each include, without limitation, one or more of a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof.

As shown in FIG. 1, the identity network 102 includes an identity provider (IDP) 104 and multiple data structures 106*a-c*, coupled thereto (or otherwise in communication therewith, etc.). The IDP 104 is configured to collect identity attributes from asserting parties (e.g., the asserting party 110, etc.) and to compile digital identities for the asserting parties based thereon. In addition, the IDP 104 is configured to store the digital identities in one or more of the data structures 106*a-c*. In this example embodiment, for instance, the data structures 106*a-c* define a decentralized data structure arrangement (or distributed data storage or data storage scheme), whereby in storing the digital identities, the IDP

104 is configured to distribute identity attributes of the digital identities to (or across) different ones of the multiple data structures 106*a-c*, whereby a completed digital identity is not generally included in only one of the data structures 106*a-c* (e.g., such that an individual one of the data structures 106*a-c* does not include all attributes of the completed digital identity, etc.).

In connection therewith, the digital identities generally include different attributes of the asserting parties, which may include, for example, names, mailing addresses, email addresses, phone numbers (e.g., mobile numbers, etc.), dates of birth (DOBs), cities of birth, genders, race, citizenship, government identification numbers (e.g., social security numbers, Aadaar numbers, etc.), document identifiers (IDs) (e.g., driver license numbers, passport numbers, etc.), bio-metrics (e.g., fingerprints, facial images, etc.), etc. and other information that may alone, or in combination, identify (at least in part) a specific person or user, etc. In general, it is expected that attributes of a specific type will only be included on one digital identity, or a limited number of digital identities, each associated with a same user. A document ID, for example, is expected to be included in limited digital identities, while a date of birth may be common among several digital identities, if not hundreds or more, for a given user.

Figure 2A:
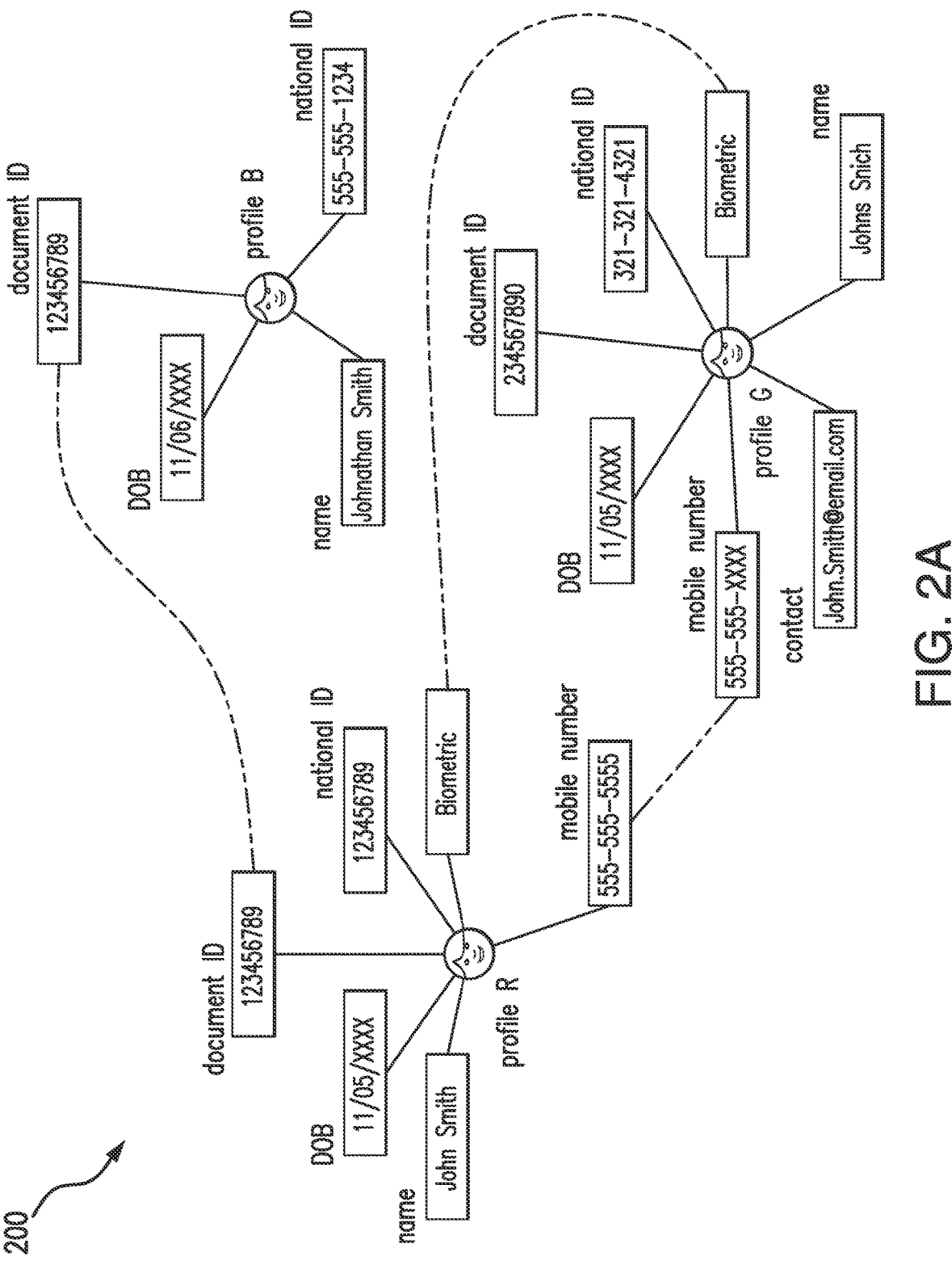
FIGS. 2A-2B illustrate example identity graphs of different attributes associated with a digital identity of a user.

FIG. 2A illustrates an identity network graph diagram 200 for the asserting party 110, for example, which includes three different digital identities for the asserting party 110 designated profile R, profile B, and profile G. Each of the profiles includes different attributes of the asserting party 110, such as, for example, a name, a document ID, a national ID, a DOB, a mobile number, etc. Also, as shown, certain of the attributes are common among the different profiles for the asserting party 110, including, specifically, the mobile number, which is common between the profiles R and G; the document ID, which is common between the profiles R and B; and the DOB, which is common between the profiles R, B, and G. That said, consistent with the above, it should be appreciated that, while the digital identity indicated by profile R, for example, includes six different attributes: a name, a DOB, a document ID, a national ID, a biometric (e.g., an actual biometric, a biometric template, a biometric token, one or more combinations thereof, etc.), and a mobile number, the attributes are distributed to the different data structures 106*a-c* of the identity network 102 (thereby providing decentralized storage of the digital identity indicated by profile R). The same applies to the four different attributes of the digital identity indicated by profile B and the seven different attributes of the digital identity indicated by profile G.

Further, while the network graph 200 is illustrated as a visual graph in FIG. 2A, in which nodes are attributes for the asserting party 110 and links between the profiles show relatedness between attributes (e.g., as part of the same profile, as matches, etc.), it should be appreciated that network graphs may include other forms in other example embodiments, which may not be visual/graphical in nature. For example, in some embodiments network graphs may be compiled in tabular form, etc.

Referring again to FIG. 1, it should be appreciated that the data structures 106*a-c* may be logically separated within one or more computing devices, or geographically separated within one or more computing devices in one or more different regions. Regions, for example, may include differ-ent cities, states, territories, provinces, countries, etc. And, it should be appreciated that the identity network 102 may be a network-based (e.g., hosted, etc.) service for providing identity services, as described herein. Additionally, or alter-nately, the identity network 102 may be a standalone entity or may be incorporated, in whole or in part, with another entity in the system 100, such as, for example, a payment processing network or a banking institution, or service provider, etc. Specifically, for example, in one embodiment, the identity network 102 may be incorporated, in whole or in part, into the Mastercard™ payment processing network.

In various example embodiments, the asserting party 110 is a user, that is attempting to either provision a digital identity including certain identity attributes, update such a digital identity, or share one or more attributes of a digital identity with one or more relying parties (e.g., the relying party 112, etc.), where the attribute(s) provide a basis to interact with the relying party(ies) (e.g., to open an account, to access a desired service, etc.). And, the relying party 112 may be, without limitation, a financial institution (e.g., a bank provider, an investment provider, etc.), a service pro-vider (e.g., a telecommunication provider, a utility company, a digital content provider, a social network, a merchant, etc.), or other party intent on relying on a digital identity of a user (or asserting party) for interactions therewith.

As indicated above, the IDP 104 is configured to receive multiple identity attributes from the asserting party 110, for example, in a request to enroll a digital identity, in a request to update a digital identity, etc. In connection therewith, generally based on each received identity attribute, the IDP 104 is configured to authenticate the asserting party 110, for example, through physical documents, biometrics, or other suitable techniques, etc. Once authenticated, the IDP 104 is configured to verify the identity attributes as actually belonging to the asserting party 110 (e.g., an address listed on a driver's license, a biometric of the asserting party 110 included on the driver's license, etc.) and to store the identity attributes in memory. For example, in the illustrated embodi-ment, the IDP 104 is configured to store the multiple identity attributes in or across multiple of the data structures 106*a-c*, whereby the identity attributes of the asserting party's digital identity are not limited to one central storage, i.e., they are decentralized. Additional digital identities for the asserting party 110, and others, are compiled and stored consistent with the above.

In some embodiments, the asserting party 110 may be associated with multiple digital identities, where each of the digital identities may be associated with a different purpose. For example, the asserting party 110 may compile and store a digital identity associated with a medical provider (e.g., to manage medical records, etc.), for example, and separate digital identities for a university (e.g., to take a test, etc.) or a merchant (e.g., to build a user profile, etc.). In general, however, despite the different digital identities, the digital identities are consistent when associated with the same party and are legitimate (and identify the asserting party 110). For example, a DOB, a name, and a mobile phone number are the same for each of the asserting party's different digital identities sharing the same document ID, etc.

In this example embodiment, the IDP 104 is further configured to generate a token (e.g., an attribute token, a PII token, etc.) for each of the identity attributes of each of the digital identities of the asserting party 110, and to store the tokens in a token data structure 108 (associated with the IDP 104, in communication with the IDP 104, etc.). The tokens are linked to one another (or compiled, etc.) consistent with the underlying identity attributes to form a tokenized replica of each of the digital identities of the asserting party 110, whereby profiles (e.g., token profiles, tokenized profiles, etc.) representative of the asserting party's different digital identities are created, compiled, generated, etc. In this example, as part of generating the tokens, the IDP 104 is configured to also generate a tokenized identity graphic for the asserting party's digital identities, which is representative of the actual digital identities. It should be appreciated that, as additional asserting parties enroll digital identities with the IDP 104, the IDP 104 is configured to continue to tokenize the attributes and to add the attribute tokens to the data structure 108 (e.g., in the form of a tokenized identity graphic, in tabular form, etc.). That said, in the illustrated embodiment, the token data structure 108 is different from the data structures 106*a-c* and, for example, is not part of the decentralized data structure arrangement (or distributed data storage or data storage scheme) to which the data structures 106*a-c* generally belong (or in which the data structures 106*a-c* are generally included).

In connection therewith, the IDP 104 is configured to provide consistent generation of tokens across the token data structure 108. Consequently, when an attribute, such as, for example, a driver's license number, etc., is tokenized, the resulting token is consistent regardless of the asserting party submitting the driver's license number, or the timing of the submission (e.g., Day 1 versus Day 129, etc.), etc. In this example embodiment, the IDP 104 is further configured to search for and/or compare a token, when generated, with reference to the token data structure 108, to identify any token matches (e.g., any existing tokens that are the same as the generated token, etc.). When a match is determined, the IDP 104 is configured to link the attributes, potentially, as part of different profiles. And, as additional profiles are added, by the IDP 104, the tokens and/or links among the tokens are included in the token data structure 108. That said, it should be appreciated that tokens generated for biometrics of asserting parties (e.g., for an identity attribute that includes a biometric, etc.) (e.g., biometric tokens or identity tokens, etc.) will typically be different (as such tokens are generally dynamic in nature), even if the biometrics originate from the same asserting party and are based on the same biometric feature of the asserting party (e.g., are both index fingerprints, etc.). As such, determination of a match between such tokens (e.g., such biometric tokens or identity tokens, etc.) may not be applicable as part of linking the biometric attributes, but could be done via a multi-step process, either connecting via a unique identifier linked to the biometrics or via an identity (biometric) token, when biometric matching tools can be utilized. This will be described in more detail hereinafter. That said, it should be appreciated that the biometric tokens (or identity tokens) generated herein for biometric data will be different from the corresponding biometric templates for such biometric data and the raw images associated with such biometric data (e.g., the biometric tokens (or identity tokens) generated herein for biometric data may not include (in whole or part) the biometric data (e.g., the biometric template or part thereof, the underlying biometric data or part thereof, etc.). For instance, the biometric tokens (or identity tokens) generated herein for biometric data may include meaningless numbers or digits, etc. that cannot be reversed back to the original biometric data.

Figure 2B:
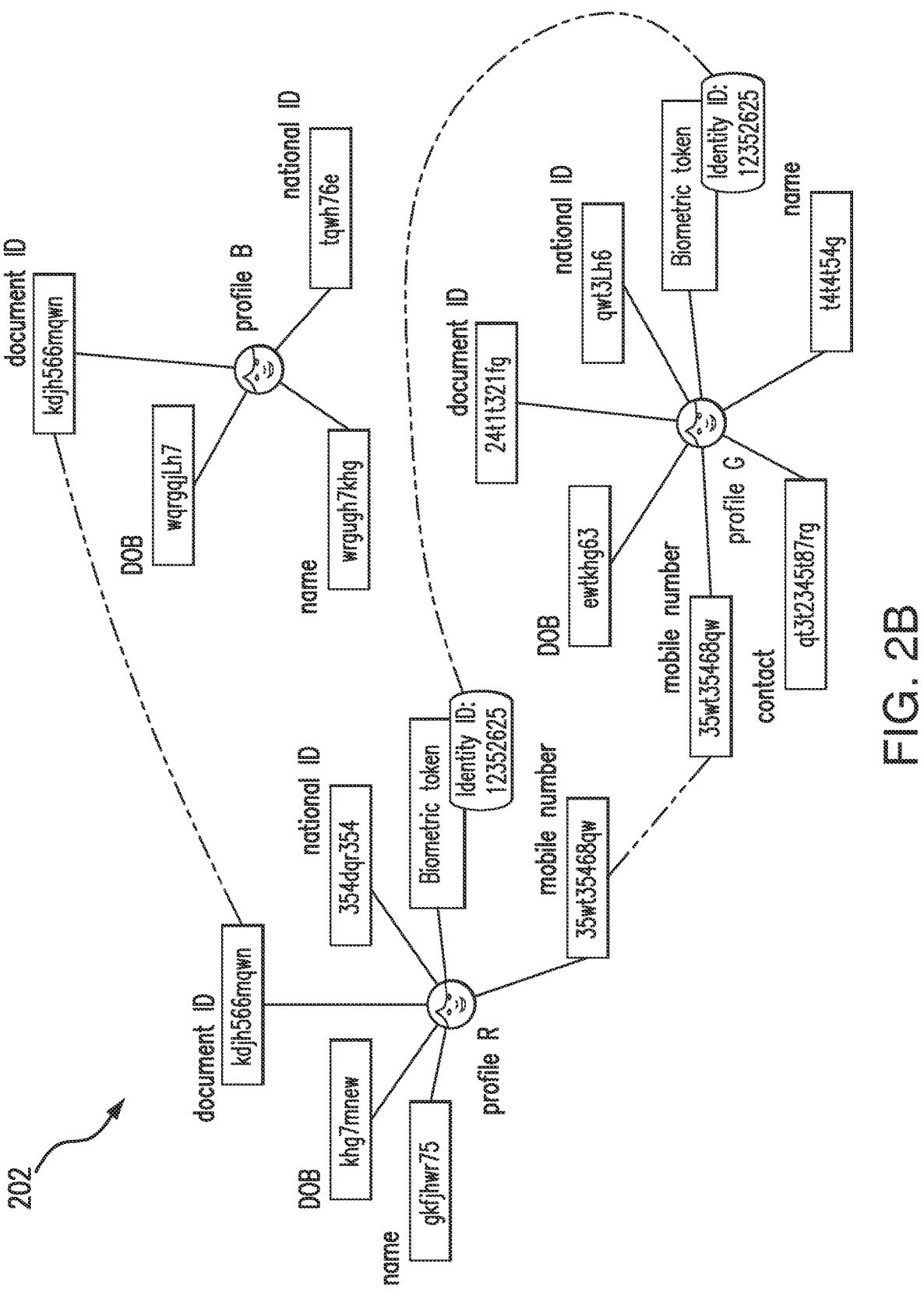

FIG. 2B illustrates an example tokenized identity network graph 202 consistent with the identity graph 200 of FIG. 2A, except that the attributes of the asserting party 110 (while still linked consistently) are obscured as tokens. As shown in FIG. 2B, for example, the tokens generated for the matching Document IDs for profiles R and B are the same, whereby the tokens are linked, consistent with the linked document IDs in FIG. 2A. Similarly, the tokens generated for the matching mobile numbers for profiles R and G are the same, whereby the tokens are linked, consistent with the linked mobile numbers in FIG. 2A. However, the tokens generated for the matching biometrics for profiles R and G are not the same but originate from the same asserting party 110, whereby the tokens may still be linked consistent with (or based on, or accounting for) the linked biometrics in FIG. 2A. Consequently, the identity network graph 202, as stored in the token data structure 108, for example, provides a representation of the attributes included in the digital identities for the asserting party 110 stored across the decentralized data structure 106*a-c*, but without including any actual personal identity information or attributes.

Based on the above, in the illustrated system 100, when an identity attribute is presented as part of a request by the asserting party 110 (e.g., as part of enrollment of a digital identity, as part of adding the attribute to an existing digital identity, etc.), the IDP 104 is configured to generate a token for the attribute and to search for the token in the token data structure 108. If no match is found (and subject to authentication and/or verification), the IDP 104 is configured to proceed to append the token to the token data structure 108, and link the token accordingly to the attribute.

Conversely, if the token is matched in the token data structure 108, the IDP 104 is configured to compare other linked tokens to determine matches among the different profiles (or digital identities) with the other attributes included in the request (if any). Consistent with FIG. 2B, where the profile R is being submitted in a request for enrollment (including the corresponding attributes), for example, the IDP 104 is configured to generate a token for the document ID, for example, and to match the token for the document ID to profile B. Then, the IDP 104 is configured to match the linked tokens for name, DOB, etc. As shown in FIB. 2B, however, the name and DOB do not match. The IDP 104 may then be configured to promote the request related to the digital identity. In promoting the request, the IDP 104 may be configured to generate a flag for the digital identity being submitted, to request authentication and/or additional authentication of the asserting party 110, to seek further verification of the matching attribute(s) and attributes submitted therewith, and/or to decline the request for the digital identity, etc. Similarly, a discovery of a new potentially fraudulent profile not previously linked to a flagged and/or fraudulent profile, may initiate a review of data elements associated with the new profile for possible fraud signals or links to other fraudulent profiles.

In addition, the IDP 104 may be configured to track tokens that match, as well as track requests including the same attributes over time, to understand velocity at which certain attributes are being submitted as part of requests. Specifically, the asserting party 110 may, for example, set up a digital identity for a medical provider, and then days or weeks later for a merchant, etc., which may be understood to be legitimate (especially when attributes of the different digital identities are consistent). A fraudster, on the other hand, may request provisioning of multiple, dozens, or hundreds, or more or less, digital identities in a relatively short period of time (e.g., a day, a week, etc.), where a common document ID or biometric is used (with other attributes then not matching, etc.). By tracking the velocity of tokens (each specific to an attribute), the IDP 104 is configured to promote digital identity requests, as described above, where an attribute is repeated above a threshold number of times over a defined interval.

As explained above, the IDP 104 is configured to match different tokens, as representative of different attributes. It should be appreciated that the attributes may include different types of attributes, i.e., dynamic and static attributes. A biometric, for example, such as a facial image, etc., may be an example of a dynamic attribute as it may experience some differences from capture to capture, and also some change over time, as the asserting party 110 ages, etc. As such, as generally described above, tokens generated for dynamic attributes (e.g., biometrics, etc.) may be different, even when the attributes originate from the same asserting party. As such, determinations of matches between such tokens may not be applicable as part of linking the biometric attributes (whereby the tokens may instead be linked based on links of the actual underlying attributes, etc.). Conversely, static attributes may include document ID numbers, dates of birth, government ID numbers (e.g., social security numbers, etc.), mobile numbers, etc., where the static attributes are less likely to change, or potentially, never change, etc. As such, tokens generated for static attributes may be the same over time, whereby determinations of matches between such tokens may readily be utilized herein.

As also explained above, in compiling the tokenized identity network graph (e.g., graph 202 of FIG. 2B, etc.), for example, the IDP 104 may be configured to generate tokens for the different attributes. To do so, the IDP 104 may be configured differently, depending on the type of attributes. For example, a token for a biometric attribute may be generated in a manner where closer biometrics yield more related tokens, whereby a closeness or relatedness of the underlying biometric may be expressed as a probability or tolerance (e.g., via the relatedness of the corresponding tokens, etc.). Such tokens (for biometric attributes) may be generated based on technology provide by (or available from) Trust Stamp by T Stamp Inc. (e.g., use of the $IT^2$ algorithm from Trust Stamp to generate irreversibly transformed identity tokens based on user biometrics (or biometric templates), etc.).

More generally, again, captured biometrics are often not exact matches to a previously captured biometric, or biometric reference, whereby a tolerance or probabilistic match is employed to account for the potential difference in captured biometrics, as well as variation in the asserting party over time. What's more, use of multiple tokens for multiple biometrics together for different biometric modalities (e.g., face and palm, right palm and left palm, etc.) may be deployed to enhance, improve, increase, etc. confidence levels in the biometric identification results. Since each identity token is unique, a biometric match is asserted when two identity tokens are determined to be sufficiently likely to be originating from the same individual. In such a scenario, when successfully matched, the new identity token match result is determined to have crossed a pre-determined, adjustable threshold upon which the biometrics are considered a match, taking into consideration a balance between false acceptance and false rejection rates. For example, a member of a health insurance program may demonstrate his/her membership at a hospital by verifying his/her identity token stored on an issued health insurance smartcard against a new identity token captured at the hospital, at the time of the digital identity verification. To facilitate further matching, the IDP 104 may be configured to associate an identity ID or pointer (or unique identifier) with each unique token for a biometric attribute, which, as compared to the token for the biometric itself, is more easily matched and may be established as a more static link or identifier. In connection therewith, the identity ID (or pointer) may include, for example, private globally unique identifier (GUID) or another identifier which links all identity tokens that belong to the asserting party 110 (e.g., the belong to the same individual, etc.). The private GUID may be randomly generated and/or assigned, and may or may not include underlying biometric data for the asserting party 110 (or corresponding user), in whole or part. In this manner, when a biometric token is generated and matched or linked to an existing biometric token (within a given tolerance (e.g., as implemented by way of the $IT^2$ algorithm from Trust Stamp, etc.)) in the token data structure 108, each of the biometric tokens in the token data structure 108 sharing the identity ID (or pointer) of the biometric will also be considered a match, from which further comparisons may be made (e.g., prior to promoting the attribute for further action, etc.).

Conversely, the IDP 104 may be configured to generate tokens for static attributes in manners where close matches yield unrelated tokens, whereby close matches are not generally realized, understood or determined, etc. Instead, for static attributes, exact matches may be required.

While only one identity network 102, one asserting party 110, and one relying party 112 are illustrated in FIG. 1, it should be appreciated that any number of these entities/components, and any number of different types of users and/or parties, may be included in the system 100, or may be included as a part of systems in other embodiments, consistent with the present disclosure. In addition, while three data structures 106a-c are illustrated as part of the identity network 102, it should be appreciated that a different number of data structures may be included for decentralizing the digital identities within the scope of the present disclosure (e.g., less than three, more than three, etc.).

Figure 3:
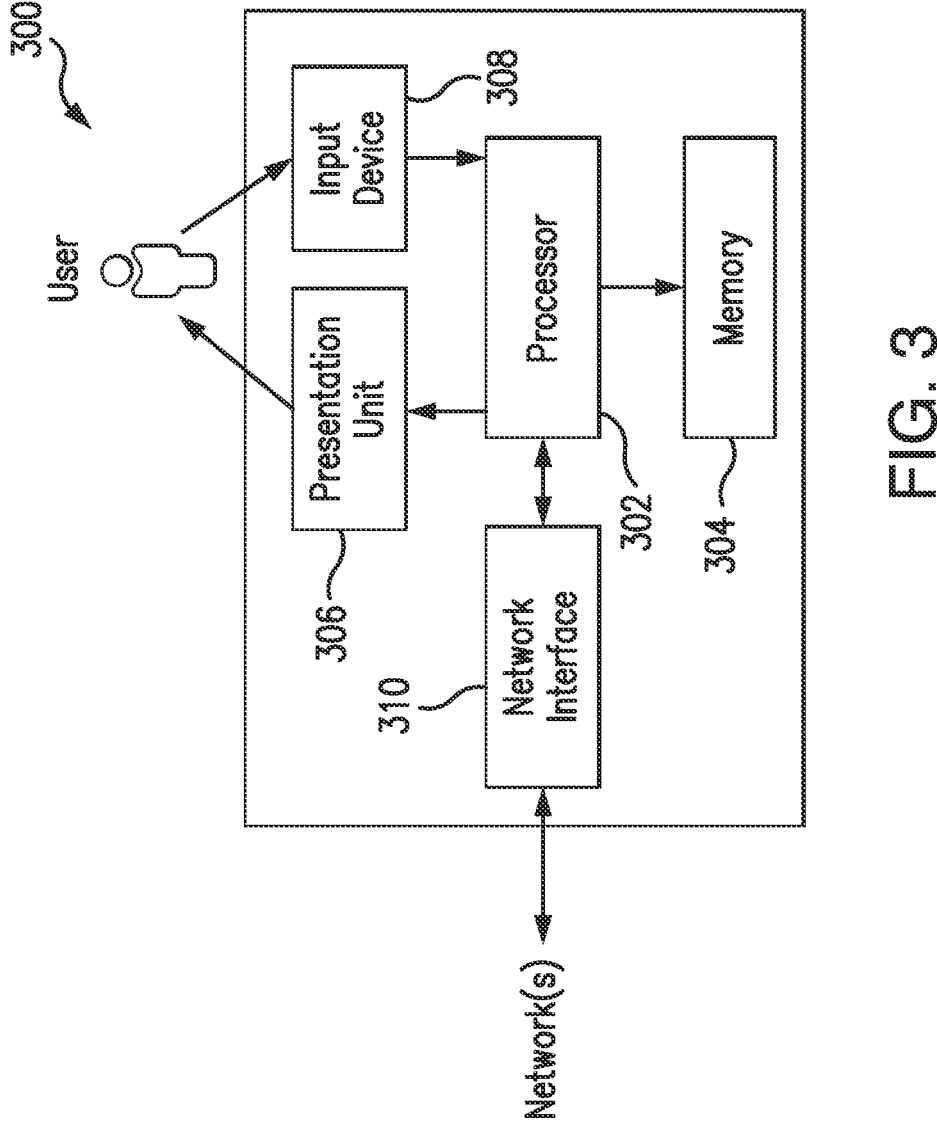
FIG. 3 is a block diagram of an example computing device that may be used in the system of FIG. 1.

FIG. 3 illustrates an example computing device 300 that may be used in the system 100. The computing device 300 may include, for example, one or more servers, workstations, personal computers, POS terminals, laptops, tablets, smartphones, PDAs, virtual devices, etc. In addition, the computing device 300 may include a single computing device, or it may include multiple computing devices located in close proximity or distributed over a geographic region as a network of computing devices, so long as the computing devices are specifically configured to function as described herein. In particular, in the example system 100 of FIG. 1, each of the IDP 104, the data structures 106a-c, the token data structure 108, the asserting party 110, and the relying party 112 may be understood as being implemented in (and/or otherwise including or associated with) one or more computing devices generally consistent with the computing device 300. That said, the system 100 should not be considered to be limited to the computing device 300, as described below, as different computing devices and/or arrangements of computing devices may be used in other embodiments. In addition, different components and/or arrangements of components may be used in other computing devices.

Referring to FIG. 3, the example computing device 300 includes a processor 302 and a memory 304 coupled to (and in communication with) the processor 302. The processor 302 may include one or more processing units (e.g., in a multi-core configuration, etc.). For example, the processor 302 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 304, as described herein, is one or more devices that permit data, instructions, etc., to be stored therein and retrieved therefrom. The memory 304 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 304 may be configured to store, without limitation, attributes of identities, links, tokens, thresholds, identity IDs or pointers, and/or other types of data (and/or data structures) suitable for use as described herein.

Furthermore, in various embodiments, executable instructions may be stored in the memory 304 for execution by the processor 302 to cause the processor 302 to perform one or more of the operations described herein (e.g., one or more of the operations described in method 400, etc.), such that the memory 304 is a physical, tangible, and non-transitory computer readable storage media. Such instructions often improve the efficiencies and/or performance of the processor 302 that is performing one or more of the various operations herein (e.g., one or more of the operations of method 400, etc.), whereby the instructions (when performed by the processor 302) effectively transform the computing device 300 into a special purpose device configured to perform the unique and specific operations described herein. It should be appreciated that the memory 304 may include a variety of different memories, each implemented in one or more of the functions or processes described herein.

In addition in the example embodiment, the computing device 300 includes a presentation unit 306 that is coupled to (and is in communication with) the processor 302 (however, it should be appreciated that the computing device 300 could include output devices other than the presentation unit 306, etc.). The presentation unit 306 outputs information (e.g., network graphs, etc.), either visually or audibly, to a user of the computing device 300, etc. And, various interfaces (e.g., as defined by applications, webpages, etc.) may be displayed at computing device 300, and in particular at presentation unit 306, to display such information. The presentation unit 306 may include, without limitation, a liquid crystal display (LCD), a light-emitting diode (LED) display, an organic LED (OLED) display, an "electronic ink" display, speakers, etc. In some embodiments, presentation unit 306 may include multiple devices.

The computing device 300 also includes an input device 308 that receives inputs from the user of the device (i.e., user inputs) such as, for example, requests for enrollment, etc. The input device 308 is coupled to (and is in communication with) the processor 302 and may include, for example, a keyboard, a pointing device, a mouse, a touch sensitive panel (e.g., a touch pad or a touch screen, etc.), another computing device, and/or an audio input device. Further, in various example embodiments, a touch screen, such as that included in a tablet, a smartphone, or similar device, may behave as both the presentation unit 306 and the input device 308.

In addition, the illustrated computing device 300 also includes a network interface 310 coupled to (and in communication with) the processor 302 and the memory 304. The network interface 310 may include, without limitation, a wired network adapter, a wireless network adapter, a mobile network adapter, or other device capable of communicating to/with one or more different networks, including one or more of the networks in FIG. 1. Further, in some example embodiments, the computing device 300 may include the processor 302 and one or more network interfaces (including the network interface 310) incorporated into or with the processor 302.

Figure 4:
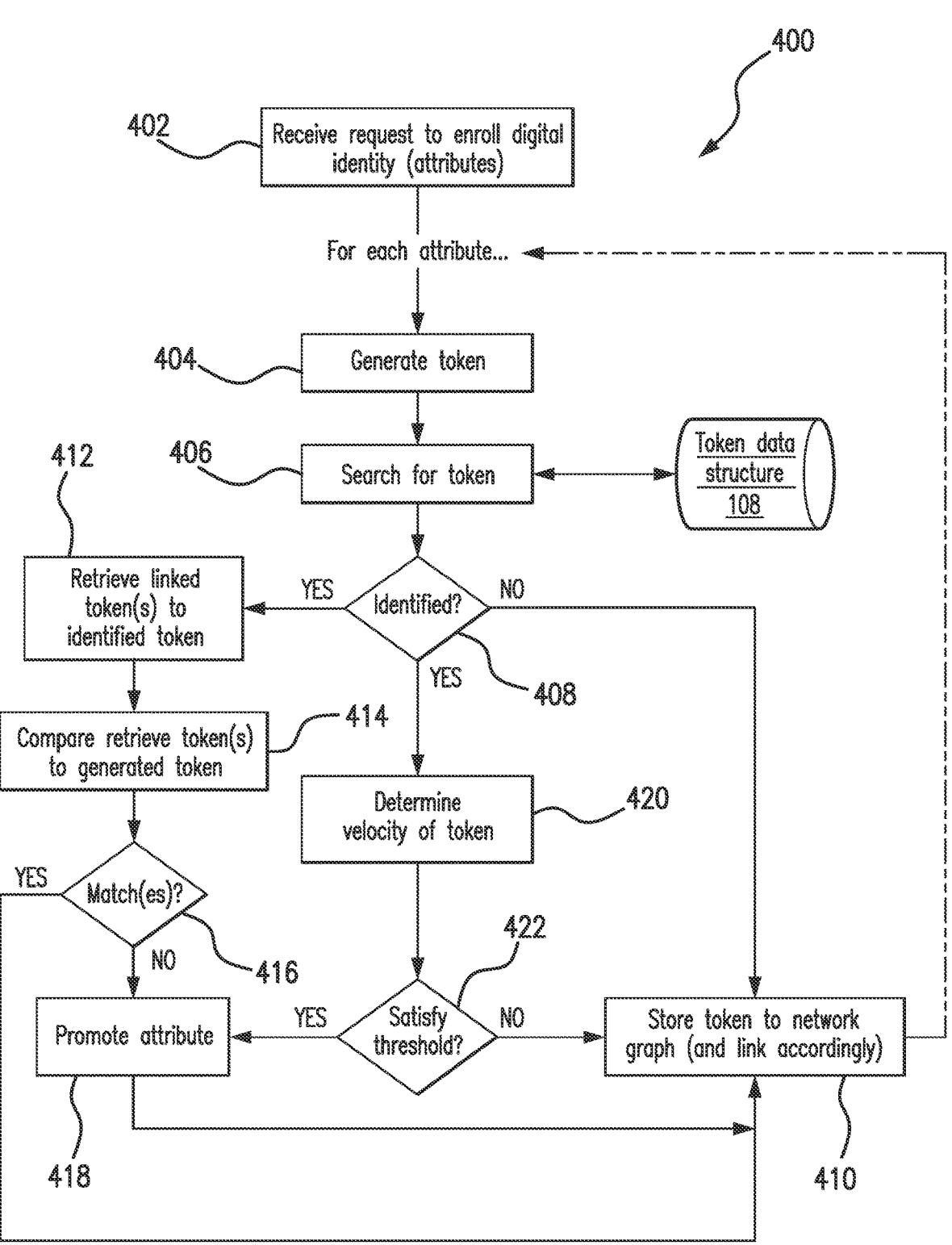
FIG. 4 includes a flow diagram of an example method, which may be implemented in connection with the system of FIG. 1, for monitoring one or more decentralized data structures including various attributes (e.g., identity attributes, etc.) of users, through tokenization of the attributes.

FIG. 4 illustrates an example method 400 for use in monitoring decentralized data structures including identity attributes, for example, through tokenization of the attributes. The example method 400 is described as implemented in the system 100, with reference to, for example, the IDP 104 and the token data structure 108, and with additional reference to the computing device 300. However, the methods herein should not be understood to be limited to the system 100 or the computing device 300, as the methods may be implemented in other systems and/or computing devices. Likewise, the systems and the computing devices herein should not be understood to be limited to the example method 400.

At the outset, it should be understood that multiple different digital identities (and their corresponding attributes) are stored in the data structures 106a-c, and a corresponding tokenized identity network graph for each is stored in the token data structure 108. Consistent with the description of FIG. 2B, for example, each of the tokenized identity network graphs includes tokenized attributes and links into profiles consistent with the digital identities stored across the data structures 106a-c. Also, for any matching biometric tokens, identity IDs (or pointers) are also assigned to the biometric tokens to provide ease of reference and/or searching. As described above, the identity IDs (or pointers) may include, for example, private GUIDs or other identifiers, which link all identity tokens that belong to the asserting party 110. The private GUID may be randomly generated and/or assigned, and may or may not include underlying biometric data for the asserting party 110, in whole or part.

In the method 400, it should also be understood, as described above, that the asserting party 110 is requesting enrollment of a digital identity in the identity network 102 (including the IDP 104). In turn, as shown in FIG. 4, the IDP 104 receives, at 402, the request to enroll the digital identity in the identity network 102. The request may be predicated on an authentication of the asserting party 110 and/or verification of attributes included in the request. For example, a liveness test may have been passed in connection with the request, along with data being pulled from a physical document, via OCR, etc. The request, then, includes a number of identity attributes for the asserting party 110, such as, for example, a name, a date of birth, a place of birth, contact information (e.g., a phone number, an email address, a physical address, etc.), a biometric, a document ID (e.g., a passport number, a driver's license number, etc.), a government ID number (e.g., a national ID, an Aadaar number, a social security number, etc.), account numbers (e.g., payment accounts, insurance accounts, etc.), gender, a height, a weight, etc. It should be appreciated that the method 400 may be implemented in instances other than requests for enrollment, such as, for example, requests for account recovery, requests associated with lost access, requests associated with verification of presented credentials (data attributes), etc.

Upon receipt of the request, the IDP 104 generates, at 404, a token for each of the received attributes. The tokens may be generated for all of the attributes, once received, or they may be generated one-by-one for each attribute (as generally represented by the dashed line in FIG. 4). In this example, each token, generally, is a one-way hash of the corresponding identity data attribute (e.g., for static attributes, for non-biometric attributes etc.), which is a unique number (e.g., including alpha and/or numeric characters, etc.) identified to the attribute, etc. Identity data attributes may include, for example: a name; a date of birth; an address; an email address; a mobile number; a national ID (e.g., CPF, SSN, etc.); a document ID; other non-biometric attributes such as, without limitation, those found on identity documents, driver's licenses, passports, national ID cards, etc.; etc. That said, for such identity data attributes (e.g., non-biometric attributes, etc.), in this example, one-way hash functions such as, for instance, the MD5 message-digest algorithm, the Snefru hash function, the Secure Hashing Algorithm 1 (SHA-1), the SHA-2 (e.g., SHA-224, SHA-256, SHA-512, etc.), the SHA-3 (e.g., SHA-384, etc.), etc. may be used to generate the tokens. In addition, in some example embodiments, the identity data attributes may be further obfuscated, or otherwise obfuscated, by technology means including, but not limited to, encryption, hashing, tokenization, etc. And, for biometric attributes, generally, a multi-step process may be used to generate the biometric tokens, whereby the tokens are not identical (even if based on the same biometric attribute form the same asserting party), yet may still be matched and attributed to the same asserting party, for example, using artificial intelligence and probabilistic matching techniques. For instance, biometric images/templates may be irreversibly transformed via a multi-step process, which results in creation of digital identity tokens, and which may then (as generally described above) be matched using probabilistic methods (e.g., the tokens may be compared and, when the comparison is within a predefined threshold, a match is determined (e.g., where the tokens may be generated based on the $IT^2$ algorithm from Trust Stamp and corresponding threshold(s), etc.), etc.). To that point, the biometric tokens may include other data elements, seeds, unique keys, in order to further limit the use of such tokens for unintended purposes. It should be appreciated that the tokenization is completed generally in a consistent or same manner, per type of attribute, whereby identical attributes will result in identical tokens.

After the attribute is tokenized, the IDP 104 searches, at 406, in the token data structure 108 for the token (or, potentially, for the identity ID (or pointer) for biometric attributes). When the token is not identified, at 408, from the search, in the token data structure 108, the IDP 104 stores, at 410, the token as part of the tokenized identity network graph for the asserting party 110 in the token data structure 108. In doing so, the IDP 104 further links the token to other tokens in the profile for the asserting party's digital identity, as needed to represent the digital identity.

Conversely, when the token is identified (i.e., a match), at 408, the IDP 104 further retrieves any linked token(s) for the identified token (and the matching attribute), at 412, and compares the retrieved linked token(s) to the generated token for the request, at 414. The token(s) may be associated with a type, such as, for example, a name, a national ID, a phone number, etc. (as shown in FIG. 2B, for example), or not. When available, at 416, the IDP 104 may compare the tokens in general, or based on the specific type (e.g., name token to name token, etc.).

It should be appreciated that multiple different profiles may include the generated token, whereby multiple profiles (and the attributes included therein) are retrieved, at 412. For example, with reference to FIG. 2B, when a token matches the national ID token of profile R, the IDP 104 retrieves the attribute tokens associated with profile R. Optionally, at 412, because the profile R shares an identical token for the document ID with profile B, the IDP 104 may further retrieve the attribute tokens included in profile B for comparison. In yet another example, when the attribute includes a biometric, the generated biometric token may be identified to the biometric token of the profile G, whereby the IDP 104 retrieves the attribute tokens of profile G, at 412, for comparison. What's more, the IDP 104 may further identify the identity ID or pointer associated with the biometric token of the profile G, and search for the identity ID or pointer (rather than the biometric token, in this example), and then identify the biometric token of profile R based on probabilistic matching of different and unique biometric tokens between disparate data profiles (as indicated by the dotted line in FIG. 2B). Consequently, the IDP 104 may further retrieve the attributes of profile R, at 412.

It should be appreciated that various different token comparisons may occur among the different retrieved tokens.

At 416, then, when there is a match (e.g., the tokens are the same for name, mobile number, date of birth, etc.), the IDP 104 stores, at 410, the generated token (from step 404) to the tokenized network graph, as described above, and proceeds to the next attribute until all attributes included in the request are evaluated. In some example, a match between tokens may include matches of the underlying attributes (e.g., matching dates of birth, matching names, matching mobile numbers, etc.). Further, in some examples a match between tokens may include that the underlying attributes are complimentary matches (e.g., work address and home address, work phone number and home phone number, etc.).

Conversely, when there are one or more mismatches (indicating conflicts among profiles), for a type of attribute, the IDP 104 promotes, at 418, the attribute for further action. In various embodiments, the IDP 104 may permit the digital identity to be provisioned/stored, but in promoting the attribute, the IDP 104 may generate a flag for the digital identity being enrolled, either in the data structures 106*a-c*, or in the token data structure 108. In the former, the flag may be provided to the relying party 112, when the digital identity is provided. In addition, the flag may be submitted to a user associated with the IDP 104, to impose a form of automated and/or manual review. Additionally, or alternatively, in promoting the attribute, the IDP 104 may require additional authentication (e.g., step-up authentication, etc.) of the asserting party 110, including, for example, additional physical documents, third party attestation, etc., or still other controls related to authentication of the asserting party 110, etc. Additionally, or alternatively, in promoting the attribute, the IDP 104 may seek verification of the attribute, and other attributes in the request (e.g., from an identity verification provider, etc.), or may impose still other controls related to attribute verification and/or validation, etc. In one or more embodiments, the IDP 104 may reject the request for enrollment of the digital identity all together. Further, in some example embodiments, promoting an attribute for further action may involve halting the underlying activity (e.g., enrollment, claims sharing, etc.).

In one example, in connection with promoting a data attribute for further action (at 418), for example, in response to a mismatch between (or conflicts among) the attribute and retrieved attribute (or tokens therefore, or profiles related thereto, etc.), the attribute may still be appended to or stored to the tokenized network graph but marked or flagged accordingly. In doing so, such marking or flag (or flagging) may include marking the attribute with additional metadata that describes the origin/source, time of data entry, usage, etc. associated with the attribute (and the enrollment request associated therewith), which may provide additional insights on circumstances under which such data attribute came to existence in the tokenized network graph. As such, in this example, where the data attribute includes a date of birth, for instance, the data attribute may be flagged as incorrect when matched to a specific name, or flagged as a synthetic data point, etc.

With continued reference to FIG. 4, after identifying the token as a match, the IDP 104 may further determine a request velocity associated with the token, at 420. In particular, as each token is stored in the token data structure 108, the IDP maintains a count of each unique token being stored, over an interval. The interval may be one day, two days, a week, a month, or more or less, depending on the particular implementation, etc. At 422, when the count of the unique token (e.g., for document ID, etc.) satisfies, or exceeds, for example, a threshold (e.g., three per month, etc.), the IDP 104 promotes the attribute (at 418) for further action, as described above, for further investigation and/or action, etc. When the count does not satisfy the threshold, at 422, the IDP 104 stores the token (at 410), as described above.

The threshold and/or interval may be general, or defined by specific activities associated with the digital identities and/or relying parties. For example, where a relying party provides specific marketing activities, or membership drives, an uptick in enrollments by asserting parties may be expected and accommodated in the intervals and/or thresholds, while still protecting from spikes in enrollments more consistent with data security issues and/or fraudster activities, etc.

What's more, in connection with the velocity accounts and/or the identification of matching tokens among inconsistent attributes, the IDP 104 may maintain a listing of attribute tokens (e.g., a watch list, etc.) that are inconsistent with expected behavior, and may continue to append attribute tokens to the list as needed. The IDP 104 may then rely on the listing of tokenized attributes, after generating a token for an attribute included in a new request, as a manner of directly promoting the attribute and/or the request including the attribute for further action.

That said, the method 400 is repeated, as needed, for requests as received from the relaying party 110 and other relying parties, etc.

In addition to the above, example embodiments of the present disclosure also generally relate to systems for use in monitoring decentralized data structures including identity attributes, through tokenization of the attributes. In one example embodiment, such a system includes a computing device configured to: receive a request associated with a digital identity, the request including multiple attributes; and for each of the multiple attributes in the request: (i) generate a token specific to the attribute; (ii) search for the generated token in a network graph, the network graph having multiple stored tokens; (iii) identify one of the multiple stored tokens as a match to the generated token; (iv) retrieve additional ones of the multiple stored tokens linked to the identified one of the stored tokens; (v) compare the retrieved tokens to the generated token; and (vi) promote the request for further action, in response to at least one of the retrieved tokens being inconsistent with the generated token.

Example embodiments of the present disclosure also generally relate to computer-readable storage media comprising executable instructions that may be executed by at least one processor in connection with monitoring decentralized data structures including identity attributes, through tokenization of the attributes. In one example embodiment, such a computer-readable storage medium includes executable instructions, which when executed by the at least one processor, cause the at least one processor to: receive a request associated with a digital identity, the request including multiple attributes; and for each of the multiple attributes in the request: (i) generate a token specific to the attribute; (ii) search for the generated token in a network graph, the network graph having multiple stored tokens; (iii) identify one of the multiple stored tokens as a match to the generated token; (iv) retrieve additional ones of the multiple stored tokens linked to the identified one of the stored tokens; (v) compare the retrieved tokens to the generated token; and (vi) promote the request for further action, in response to at least one of the retrieved tokens being inconsistent with the generated token.

Example embodiments of the present disclosure also generally relate to systems for use in managing identity attributes included in decentralized data structures, through tokenization of the identity attributes. In one example embodiment, such a system includes a computing device configured to: distribute identity attributes of a digital identity of a user to multiple different data structures of a distributed data storage scheme, so that each of the multiple different data structures includes at least one different one of the identity attributes of the digital identity but not all of the identity attributes of the digital identity; generate tokens specific to each of the identity attributes of the digital identity of the user; store the generated tokens in a token data structure, the token data structure not part of the distributed data storage scheme and different from the multiple data structures included in the distributed data storage scheme; and compile, in the token data structure, the generated tokens into a tokenized profile of the digital identity of the user.

Example embodiments of the present disclosure also generally relate to computer-readable storage media comprising executable instructions that may be executed by at least one processor in connection with managing identity attributes included in decentralized data structures, through tokenization of the identity attributes. In one example embodiment, such a computer-readable storage medium includes executable instructions, which when executed by the at least one processor, cause the at least one processor to: distribute identity attributes of a digital identity of a user to multiple different data structures of a distributed data storage scheme, so that each of the multiple different data structures includes at least one different one of the identity attributes of the digital identity but not all of the identity attributes of the digital identity; generate tokens specific to each of the identity attributes of the digital identity of the user; store the generated tokens in a token data structure, the token data structure not part of the distributed data storage scheme and different from the multiple data structures included in the distributed data storage scheme; and compile, in the token data structure, the generated tokens into a tokenized profile of the digital identity of the user.

In view of the above, the systems and method herein provides for a central representation of a decentralized data structure scheme, while preserving protections of the decentralized data structure scheme, through tokenization. By building the tokens representative of identity attributes into a representative identity network graph, newly received attributes may be subjected to analysis to determine a probability of data security issues and/or fraud (while the identity attributes are maintained in the decentralized storage (thereby protecting the data from security breaches based on access to one data structure)). In this manner, the individuals may be identified across multiple digital identities, as represented by the profiles in the token data structure, as legitimately provisioning different digital identities, or identified as fraudsters attempting to leverage certain legitimate attributes to build synthetic identities. The systems and methods herein may further provide efficient searching and/or matching of biometric tokens, through use of identity identifiers, and also may provide for velocity checks for requests having specific, distinct attributes, or combination of specific, distinct attributes, etc.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving a request associated with a digital identity, the request including multiple attributes; (b) for each of the multiple attributes in the request: (i) generating a token specific to the attribute; (ii) searching for the generated token in a network graph, the network graph having multiple stored tokens; (iii) identifying one of the multiple stored tokens as a match to the generated token; (iv) retrieving additional ones of the multiple stored tokens linked to the identified one of the stored tokens; (v) comparing the retrieved tokens to the generated token; and (vi) promoting the request for further action, in response to at least one of the retrieved tokens being inconsistent with the generated token; and (c) generating the network graph prior to receiving the request associated with the digital identity.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) distributing identity attributes of a digital identity of a user to multiple different data structures of a distributed data storage scheme, so that each of the multiple different data structures includes at least one different one of the identity attributes of the digital identity but not all of the identity attributes of the digital identity; (b) generating tokens specific to each of the identity attributes of the digital identity of the user; (c) storing the generated tokens in a token data structure, the token data structure not part of the distributed data storage scheme and different from the multiple data structures included in the distributed data storage scheme; and (d) compiling in the token data structure, the generated tokens into a tokenized profile of the digital identity of the user; (e) linking ones of the tokens of the tokenized profile of the first digital identity of the user and tokens of a tokenized profile of a second digital identity of the user that match, whereby the linking is indicative of the same identity attributes of the first and second digital identities of the user.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in monitoring decentralized data structures including identity attributes, through tokenization of the identity attributes, the method comprising:

generating a tokenized network graph, which included multiple nodes, each node representative of one attribute, each node including a hash of the one attribute represented by the node, but not the attribute itself; and wherein ones of the nodes are linked to other ones of the nodes based on common use of the attributes represented by the linked ones of the nodes;

storing the tokenized network graph in a decentralized data structure arrangement, which includes multiple data structures, the multiple identity attributes including a biometric attribute;

receiving, at a computing device, a request associated with a digital identity of an asserting party, the request including multiple identity attributes; and for the biometric attribute of the multiple identity attributes in the request:

generating, by the computing device, a token specific to the identity attribute, the generated token is a biometric token based on the biometric attribute;

searching, by the computing device, in the decentralized data structure arrangement, for the generated token in a tokenized network graph;

identifying, by the computing device, one of the hashed attributes of the tokenized network graph as a match to the generated token;

retrieving, by the computing device, additional hashed attributes from the tokenized network graph, based on the nodes including the additional hashed attributes being linked to the node of the identified one of the hashed attributes in the tokenized network graph, through a pointer associated with the identified one of the hashed attributes, the pointer not including the biometric attribute;

comparing, by the computing device, the retrieved additional hashed attributes to generated tokens for other ones of the multiple identity attributes in the request; and promoting, by the computing device, the request for further action, in response to at least one of the retrieved additional hashed attributes being inconsistent with the generated tokens for the other ones of the multiple identity attributes.

2. The computer-implemented method of claim 1, wherein the identity attributes in the request include multiple of a name, a date of birth, a national identifier, a document identifier and a biometric.

3. The computer-implemented method of claim 1, wherein identifying the one of the hashed attributes as a match to the generated token includes identifying the one of the hashed attributes as a probabilistic match to the generated token based on at least one threshold.

4. The computer-implemented method of claim 3, wherein the pointer includes a randomly generated globally unique identifier.

5. The computer-implemented method of claim 1, wherein the further action includes one of: further authentication of the asserting party and further verification of one or more of the attributes included in the request.

6. A computer-implemented method for use in monitoring decentralized data structures including identity attributes, through tokenization of the identity attributes, the method comprising:

generating a tokenized network graph, which included multiple nodes, each node representative of one attribute, each node including a hash of the one attribute represented by the node, but not the attribute itself; and wherein ones of the nodes are linked to other ones of the nodes based on common use of the attributes represented by the linked ones of the nodes;

storing the tokenized network graph in a decentralized data structure arrangement, which includes multiple data structures;

receiving, at a computing device, a request associated with a digital identity of an asserting party, the request including multiple identity attributes, the multiple identity attributes including a biometric attribute; and for the biometric attribute of the multiple identity attributes in the request:

generating, by the computing device, a token specific to the identity attribute, wherein the generated token is a biometric token based on the biometric attribute;

searching, by the computing device, in the decentralized data structure arrangement, for the generated token in a tokenized network graph;

identifying, by the computing device, one of the hashed attributes of the tokenized network graph as a match to the generated token;

retrieving, by the computing device, additional hashed attributes from the tokenized network graph, based on the nodes including the additional hashed attributes being linked to the node of the identified one of the hashed attributes in the tokenized network graph, through a pointer associated with the identified one of the hashed attributes, the pointer including a randomly generated globally unique identifier;

comparing, by the computing device, the retrieved additional hashed attributes to generated tokens for other ones of the multiple identity attributes in the request; and promoting, by the computing device, the request for further action, in response to at least one of the retrieved additional hashed attributes being inconsistent with the generated tokens for the other ones of the multiple identity attributes.

7. The computer-implemented method of claim 6, wherein the identity attributes in the request include multiple of a name, a date of birth, a national identifier, a document identifier and a biometric.

8. The computer-implemented method of claim 6, wherein identifying the one of the hashed attributes as a match to the generated token includes identifying the one of the hashed attributes as a probabilistic match to the generated token based on at least one threshold.

9. The computer-implemented method of claim 6, wherein the further action includes one of: further authentication of the asserting party and further verification of one or more of the attributes included in the request.

* * * * *